(12) United States Patent
Jung

(10) Patent No.: US 6,971,743 B2
(45) Date of Patent: Dec. 6, 2005

(54) FIXING STRUCTURE OF SIDE SHIELD FOR GLASSES

(75) Inventor: Sung Mo Jung, Daegu (KR)

(73) Assignee: Sam Chung Optical Co., Ltd., Daegu (KR)

( * ) Notice: Subject to any disclaimer, the term of this patent is extended or adjusted under 35 U.S.C. 154(b) by 30 days.

(21) Appl. No.: 10/815,807

(22) Filed: Apr. 2, 2004

(65) Prior Publication Data

US 2005/0162609 A1    Jul. 28, 2005

(30) Foreign Application Priority Data

Jan. 28, 2004    (KR)    ............... 20-2004-0002017 U

(51) Int. Cl.[7] ............................................... G02C 7/10
(52) U.S. Cl. ............................ 351/44; 351/158; 2/448; 2/449
(58) Field of Search ........................ 351/44, 41, 121, 351/111, 158; 2/448, 449, 450, 12, 13, 451

(56) References Cited

U.S. PATENT DOCUMENTS 5,548,351 A * 8/1996 Hirschman et al. ........... 351/47
6,540,347 B1 * 4/2003 Radziwon et al. ............ 351/41

* cited by examiner

Primary Examiner—Hung Xuan Dang
(74) Attorney, Agent, or Firm—Mayer, Brown, Rowe & Maw LLP

(57) ABSTRACT

The present invention relates to a fixing structure of a side shield for glasses wherein a side shield installed in glasses legs, comprising a through hole formed in inner upper and lower portions of a rear end of a side shield surrounding the glasses legs, and a fixture having an elastic piece in the interior of the same and a hook part in the upper and lower sides of a front end wherein said fixture is inserted through an opening of the side shield, and the hook part of the fixture is engaged to the though hole, and the elastic piece of the fixture is elastically closely contacted with the glasses legs. In the present invention, the size of the fixture is large, and the hook part of the fixture is inserted into the through hole formed in the side shield. Therefore, anyone can easily insert the fixture for thereby achieving a convenient assembling work, and the side shield is easily fixed to the glasses legs.

9 Claims, 8 Drawing Sheets

FIXING STRUCTURE OF SIDE SHIELD FOR GLASSES

BACKGROUND OF THE INVENTION

1. Field of the Invention

The present invention relates to a fixing structure of a side shield for glasses, and in particular to a fixing structure of side shield for glasses capable of protecting user's eyes from a foreign substance that may be inputted through a glasses leg and a glasses frame wherein a fixing structure of the present invention is engaged to left and right glasses legs of glasses, and in particular to a fixing structure of a side shield for glasses capable of enhancing a productivity and a convenience of use by users wherein a side shield is easily assembled to glasses legs.

2. Description of the Background Art

Generally, when a user wears glasses, a distance between a glasses leg and a glasses frame is very wide. In addition, various foreign substances may be inputted between a space between the glasses legs and the glasses frame because there are many foreign substances in the air. Therefore, user's eyes may be damaged by the foreign substances inputted through the above space.

Therefore, a side shield is installed outside the space between the glasses legs and the glasses frame. In a conventional art, an installation hole is formed in an attaching surface of the side shield. Screws are engaged to the glasses legs through the installation holes for thereby fixing the side shield to the glasses legs.

However, in the conventional art in which the side shield is fixed by engaging the screws, an error ratio is large, and the size of screw is small. The work for engaging the screws is difficult. Therefore, the workability is decreased.

Therefore, in the registered Korean utility model No. 2199 filed in 1999 by the same applicant as the present invention, the side shield is fixed to the glasses legs using a fixing pin instead of using the screws. The fixing pin has a body having the same diameter as the diameter of the installation hole formed in the side shield. A pinhead is expanded at one end of the body, so that an elastic piece divided by an engaging part is formed at the other end of the body. A curved part formed together with an engaging shoulder part is integrally formed in an outer end portion of the elastic piece.

In the above conventional art, when a fixing pin is inserted into the installation hole formed in the side shield, the side shield is fixed to the glasses leg by the fixing pin.

However, in the above conventional art, since work for engaging screws is not needed, workability is slightly enhanced. However, the size of the fixing pin cannot be increased due to an outer visual view of the glasses. Therefore, the assembling work is not easy.

SUMMARY OF THE INVENTION

Accordingly, it is an object of the present invention to provide a fixing structure of a side shield for glasses capable of overcoming the problems encountered in the conventional art.

It is another object of the present invention to provide a fixing structure of a side shield for glasses capable of enhancing a workability and a convenience of use by users in such a manner that a side shield is elastically fixed to the glasses legs using a fixture, and the size of the fixture is adjustable, so that anyone can easily fix and assembly a side shield to the glasses legs.

To achieve the above objects, there is provided a fixing structure of a side shield for glasses wherein a side shield installed in glasses legs, comprising a through hole formed in inner upper and lower portions of a rear end of a side shield surrounding the glasses legs; and a fixture having an elastic piece in the interior of the same and a hook part in the upper and lower sides of a front end wherein said fixture is inserted through an opening of the side shield, and the hook part of the fixture is engaged to the though hole, and the elastic piece of the fixture is elastically closely contacted with the glasses legs.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

The preferred embodiments of the present invention will be described with reference to the accompanying drawings.

Figure 1:
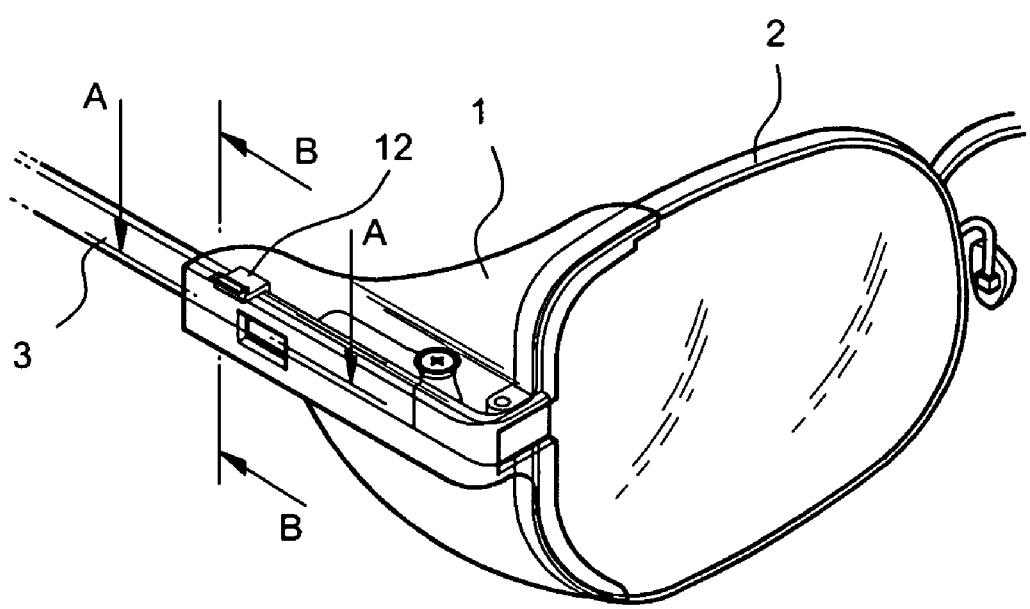
FIG. 1 is a perspective view illustrating glasses having a fixing structure of a side shield according to the present invention.

FIG. 1 is a view illustrating part of glasses to which a fixing structure of a side shield according to the present invention is adapted. The side shield 1 is formed in a structure surrounding a connection part a glasses frame 2 and glasses legs 3.

In addition, the fixing structure of the side shield for glasses according to the present invention is achieved by fixing the side shield 1 to the glasses legs 3.

Figure 2:
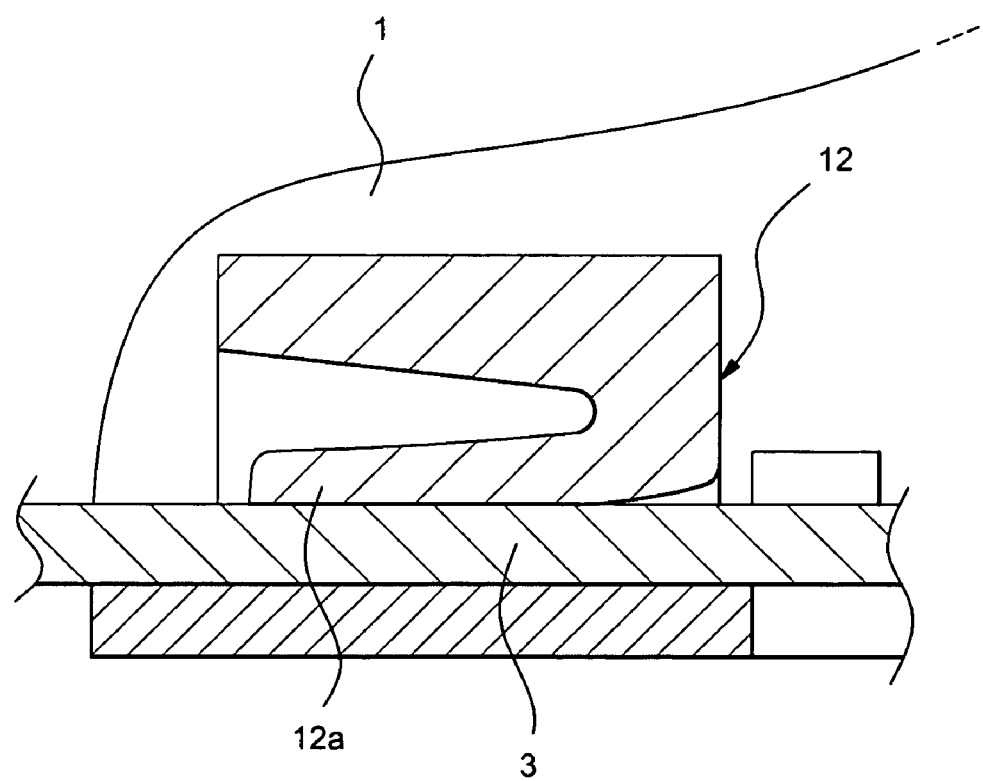
FIG. 2 is a cross sectional view taken along the line A—A of FIG. 1 illustrating a fixing structure of a side shield for glasses according to a first embodiment of the present invention.
Figure 3:
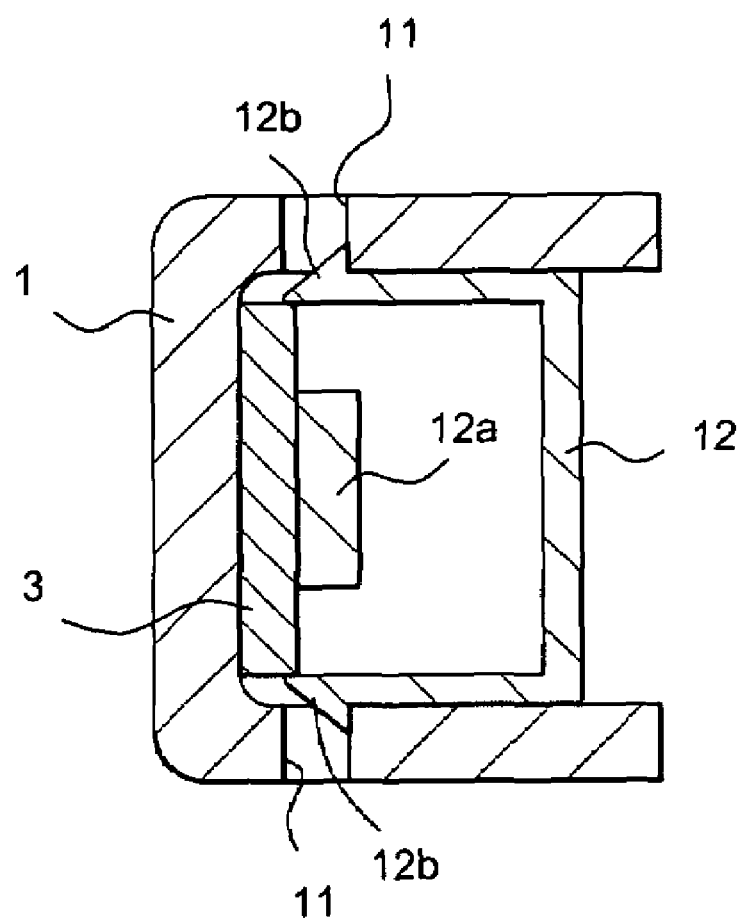
FIG. 3 is a cross sectional view taken along the line B—B of FIG. 1.

As shown in FIGS. 2 and 3, in the fixing structure of the present invention, a through hole 11 is formed in the side shield 1 surrounding the glasses leg 3, and the side shield 1 is elastically fixed to the glasses legs 3 using a fixture 12.

Namely, the though hole 11 is formed in the inner upper and lower portions of the rear portion of the side shield 1 that surrounds the glasses leg 3. An elastic piece 12a is protruded from the fixture 12. A hook part 12b is formed in the outer upper and lower portions of the front end.

In addition, the fixture 12 is inserted through an opening of the side shield 1, and the hook part 12b of the fixture 12 is engaged to the through hole 11, so that the elastic piece 12a of the fixture 12 is closely contacted with the glasses legs 3.

Figure 5:
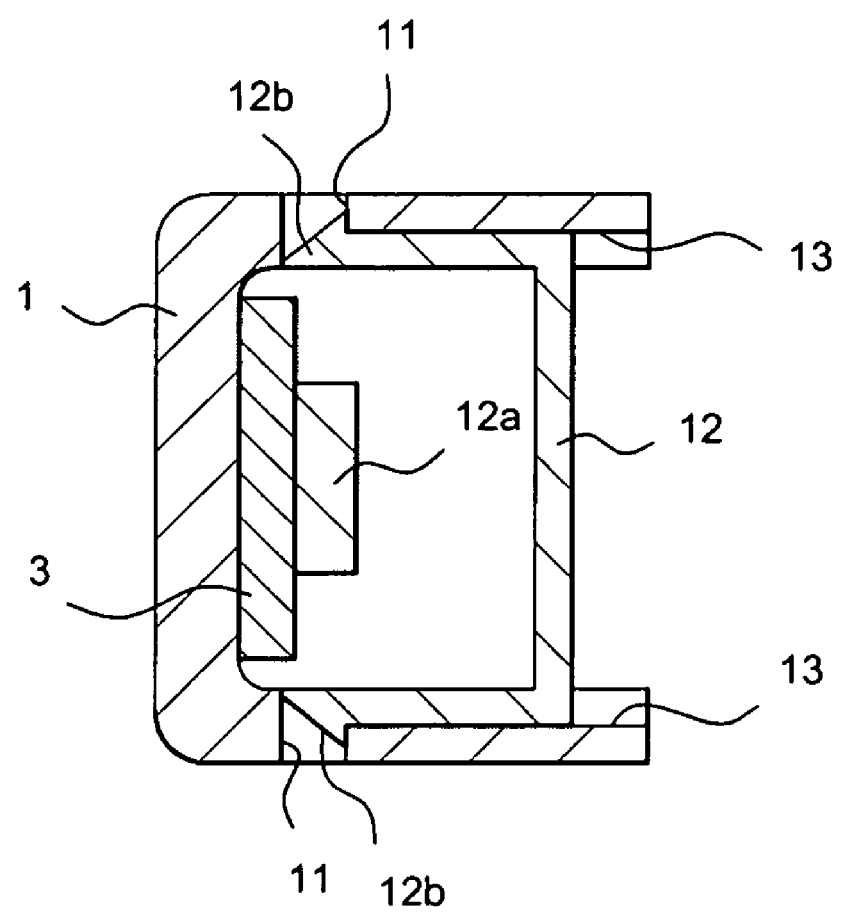
FIG. 5 is a cross sectional view taken along the line B—B of FIG. 1 according to a fixing structure of a side shield for glasses according to a third embodiment of the present invention.
Figure 6:
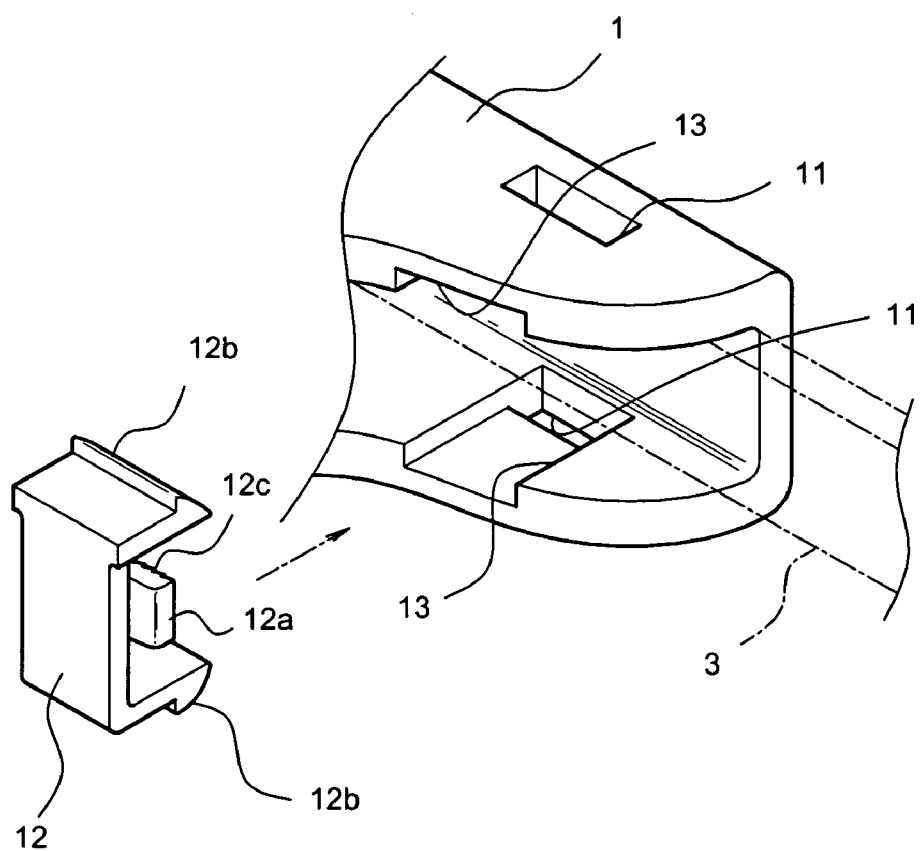
FIG. 6 is a partial disassembled view of the embodiment of FIG. 5.
Figure 8:
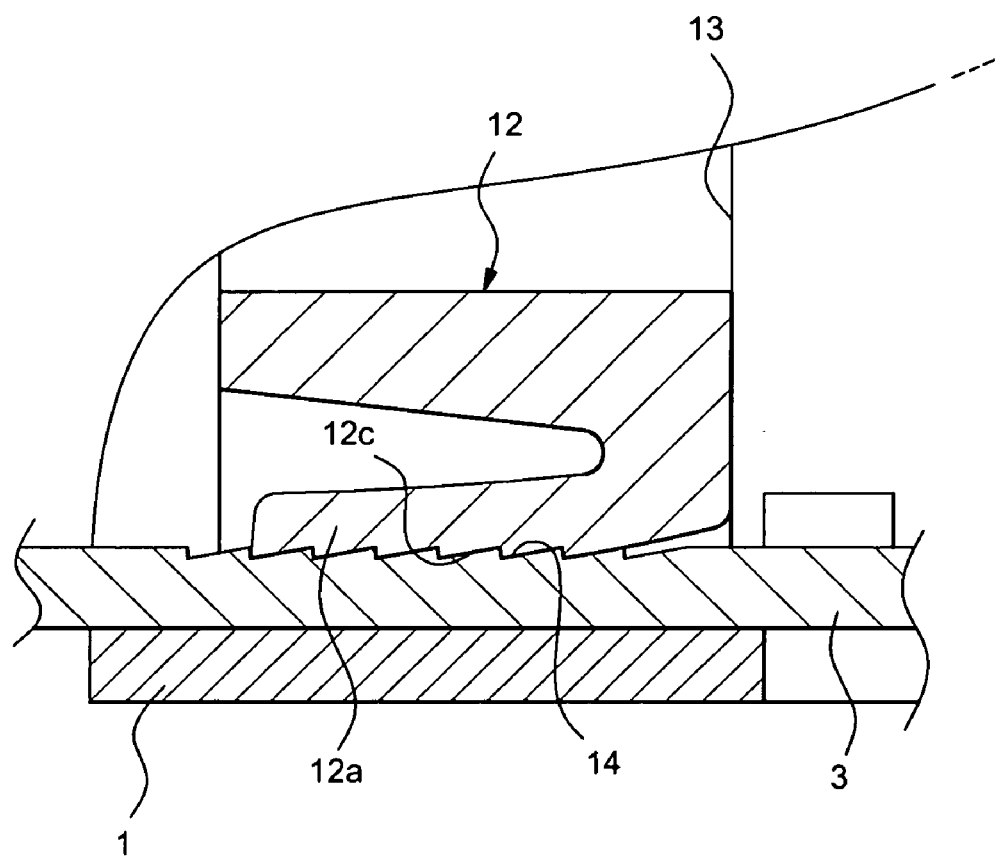
FIG. 8 is a cross sectional view taken along the line A—A of FIG. 1 illustrating a fixing structure of a side shield for glasses according to a fifth embodiment of the present invention.

As shown in FIGS. 5, 6 and 8, there is provided a guide part 13 formed in the inner upper and lower portions of the side shield 1 for guiding the fixture 12 to the through hole 11 formed in the side shield 1.

Namely, the guide part 13 is formed in the inner upper and lower portions of the opening of the side shield 11 surrounding the glasses leg 3, and the through hole 11 is formed in an inner side of the guide part 13.

Therefore, the whole portions of the fixture 12 are inserted along the guide part 13 formed in the side shield 1, so that the hook part 12b of the fixture 12 is engaged to the through hole 11 formed in the side shield 1, and the elastic piece 12a of the fixture 12 is elastically closely contacted with the glasses leg 3.

Figure 4:
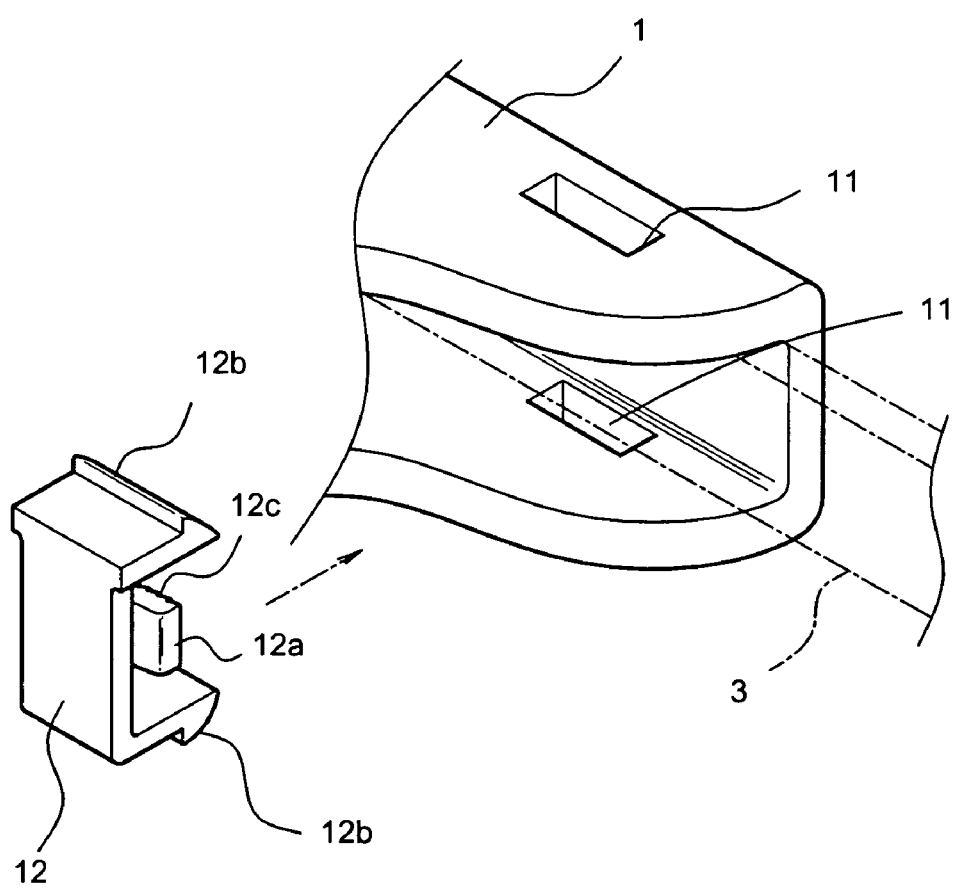
FIG. 4 is a partial disassembled perspective view illustrating a fixing structure of a side shield for glasses according to a second embodiment of the present invention.

If the elastic piece 12a of the fixture 12 has a very smooth surface, since a friction coefficient is too low, it may be easily slid. As shown in FIGS. 4 and 6, in order to increase the friction coefficient between the elastic piece 12a and the glasses legs 3, a threaded portion 12c is formed in the surface closely contacting with the glasses legs 3 in the elastic piece 12a of the fixture 12.

Figure 7:
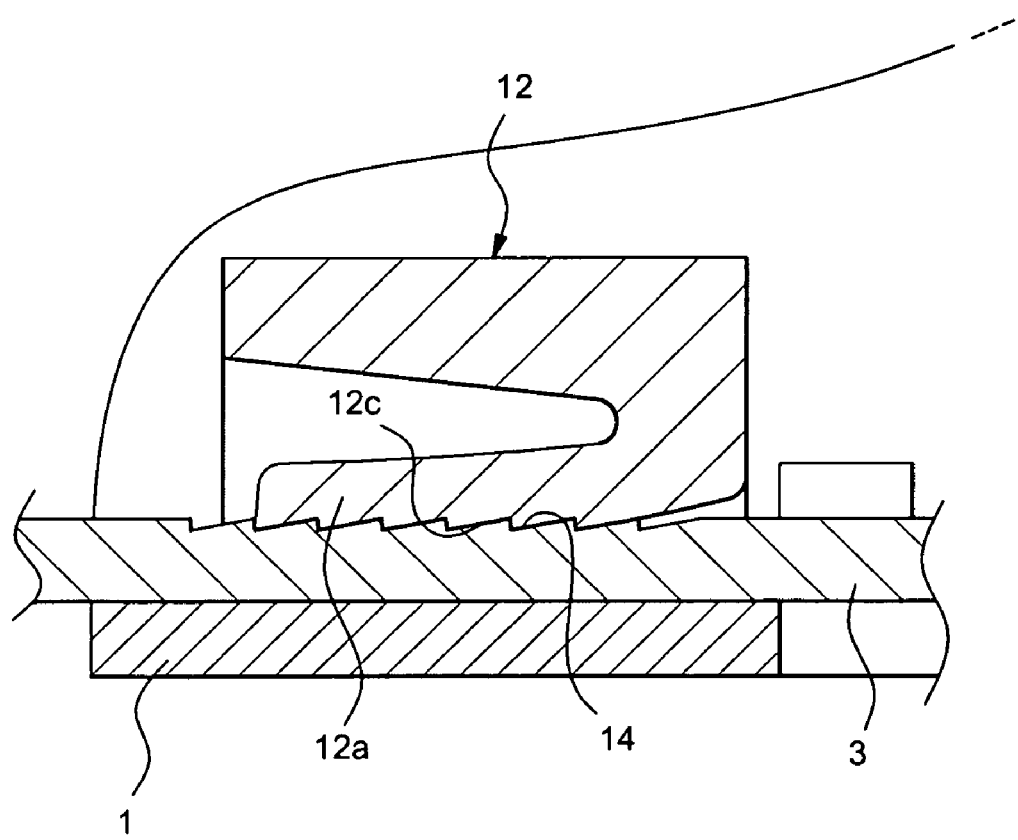
FIG. 7 is a cross sectional view taken along the line A—A of FIG. 1 illustrating a fixing structure of a side shield for glasses according to a fourth embodiment of the present invention.

In particular, in order to stably fix the side shield 1 to the glasses legs 3, as shown in FIGS. 7 and 8, a threaded portion 14 engaged with the threaded portion 12c is formed in the elastic piece 12a of the fixture 12.

Therefore, the threaded portion 14 formed in the glasses legs 3 is engaged with the threaded portion of the fixture 12, so that the side shield 1 is stably fixed to the glasses legs 3.

In order to insert the fixture 12 into the side shield 1 in a certain direction constantly, as shown in FIG. 6, the width of the upper side of the fixture 12 is preferably wider than the width of the lower side of the same, and the widths of the upper and lower sides of the guide part 13 of the side shield 1 are preferably the same as the widths of the upper and lower sides of the fixture 12.

In addition, the size of the hook part 12b of the fixture 12 is preferably the same as the size of the through hole 11 formed in the side shield 1.

Therefore, the fixing structure of the side shield for glasses according to the present invention is designed to surround the connection portions of the glasses frame 2 and the glasses legs 3, and the side shield 1 is elastically fixed to the glasses legs 3 using the fixture 12.

Namely, the side shield 1 is arranged to surround the connection portions of the glasses frame 2 and the glasses legs 3, and the fixture 12 is inserted along the guide part 13 formed in the side shield 1.

When the hook part 12b of the fixture 12 is engaged to the through hole 11 formed in the side shield 1, the installation work of the fixture 12 is finished.

At this time, the elastic piece 12a of the fixture 12 is closely elastically contacted with the glasses leg 3, and the threaded portion 14 formed in the glasses leg 3 is engaged with the threaded portion of the fixture 12, and the side shield 1 is engaged to the glasses legs 3, and the fixture 12 remains engaged through the opening of the side shield 1.

As described above, in the fixing structure of the side shield for glasses according to the present invention, the size of the fixture is large, and the hook part of the fixture is inserted into the through hole formed in the side shield.

Therefore, anyone can easily insert the fixture, and an assembling work is easy. The side shield is easily fixed to the glasses legs.

In addition, in the present invention, since the fixture is inserted along the guide part formed in the side shield, the side shield is stably and conveniently fixed. The productivity is increased. Since the fixture is embedded based on the size of the side shield, an outer visual view is good. The user can easily use the present invention.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A fixing structure of a side shield for glasses wherein a side shield installed in glasses legs, comprising:
    a through hole formed in inner upper and lower portions of a rear end of a side shield surrounding the glasses legs; and
    a fixture having an elastic piece in the interior of the fixture and a hook part in the upper and lower sides of a front end wherein said fixture is inserted through an opening of the side shield, and the hook part of the fixture is engaged to the though hole, and the elastic piece of the fixture is elastically closely contacted with the glasses legs.

2. The structure of claim 1, further comprising a guide part formed in the inner upper and lower sides of the side shield for guiding the fixture to the through hole formed in the side shield.

3. The structure of claim 1, wherein a threaded portion is formed in a surface closely contacting with the glasses legs in the elastic piece of the fixture.

4. The structure of claim 2, wherein a threaded portion is formed in a surface closely contacting with the glasses legs in the elastic piece of the fixture.

5. The structure of claim 3, wherein a threaded portion engaging with the threaded portion formed in the elastic piece of the fixture is formed in the glasses legs.

6. The structure of claim 4, wherein a threaded portion engaging with the threaded portion formed in the elastic piece of the fixture is formed in the glasses legs.

7. The structure of claim 2, wherein the width of the upper side of the fixture is wider than the width of the lower side of the fixture, and the widths of the upper and lower sides of the guide part formed in the side shield are the same as the widths of the upper and lower sides of the fixture.

8. The structure of claim 4, wherein the width of the upper side of the fixture is wider than the width of the lower side of the fixture, and the widths of the upper and lower sides of the guide part formed in the side shield are the same as the widths of the upper and lower sides of the fixture.

9. The structure of claim 6, wherein the width of the upper side of the fixture is wider than the width of the lower side of the fixture, and the widths of the upper and lower sides of the guide part formed in the side shield are the same as the widths of the upper and lower sides of the fixture.

* * * * *